United States Patent [19]

Honsinger

[11] Patent Number: 4,476,408

[45] Date of Patent: Oct. 9, 1984

[54] HIGH EFFICIENCY, LOW COST PERMANENT MAGNET AC MACHINE

[75] Inventor: Vernon B. Honsinger, Ballston Lake, N.Y.

[73] Assignee: General Electric Company, Schenectady, N.Y.

[21] Appl. No.: 381,819

[22] Filed: May 25, 1982

Related U.S. Application Data

[63] Continuation-in-part of Ser. No. 041,864, May 23, 1979, abandoned.

[51] Int. Cl.³ .......................................... H02K 21/12
[52] U.S. Cl. .................................. 310/156; 310/162; 310/163
[58] Field of Search ............................... 310/162–165, 310/24, 156, 261

[56] References Cited

U.S. PATENT DOCUMENTS 3,492,520  1/1970  Yates ............................... 310/162 X
3,840,763  10/1974  Baumann et al. ..................... 310/156
4,139,790  2/1979  Steen .............................. 310/156

Primary Examiner—Donovan F. Duggan
Attorney, Agent, or Firm—William H. Steinberg; James C. Davis, Jr.; Marvin Snyder

[57] ABSTRACT

A high efficiency permanent magnet AC machine comprises a permanent magnet rotor mounted for rotation within a stator excited by alternating current. The rotor is formed of a cylindrical core of unitary laminations into which a squirrel cage winding is embedded. Current is induced in the winding to provide sufficient torque to accelerate the rotor from rest. Magnetic members are secured through the rotor core such that an even number of radial magnetic member segments each extend parallel to a respective quadrature machine axis. The magnetic members each generate magnetic flux which is directed parallel to a respective direct axis and perpendicular to a respective quadrature axis of the machine. As the rotor accelerates to synchronous speed, rotor flux interacts with stator flux causing the rotor to synchronize with the rotating stator field, thus allowing the machine to achieve synchronous machine performance.

2 Claims, 8 Drawing Figures

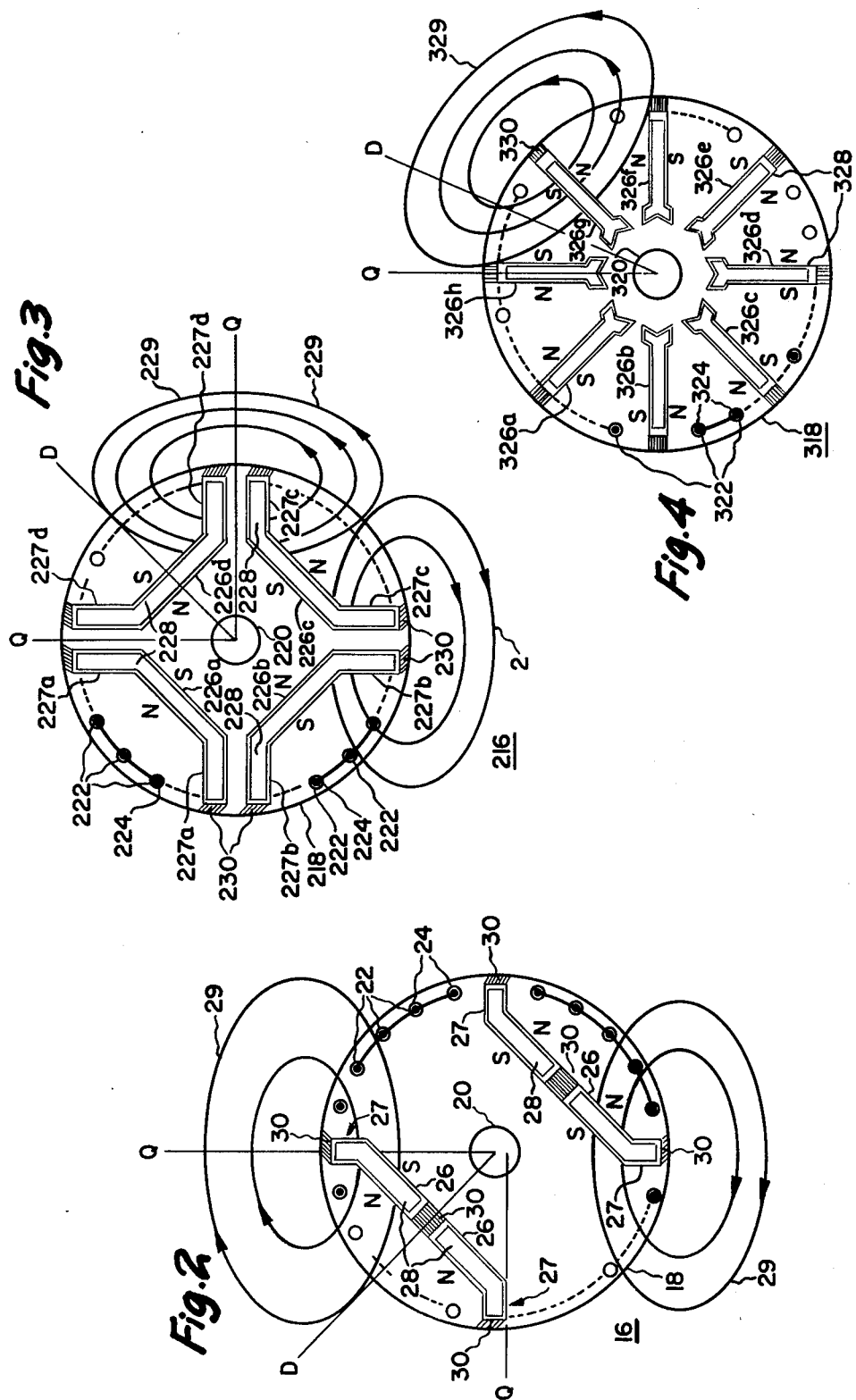

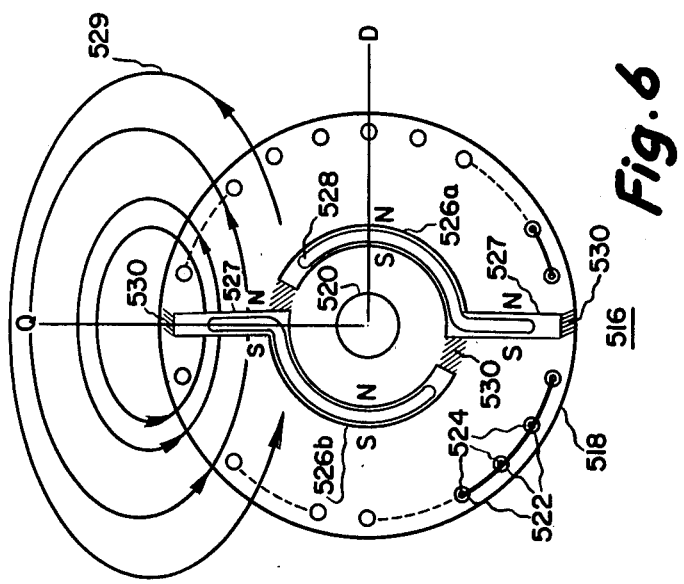
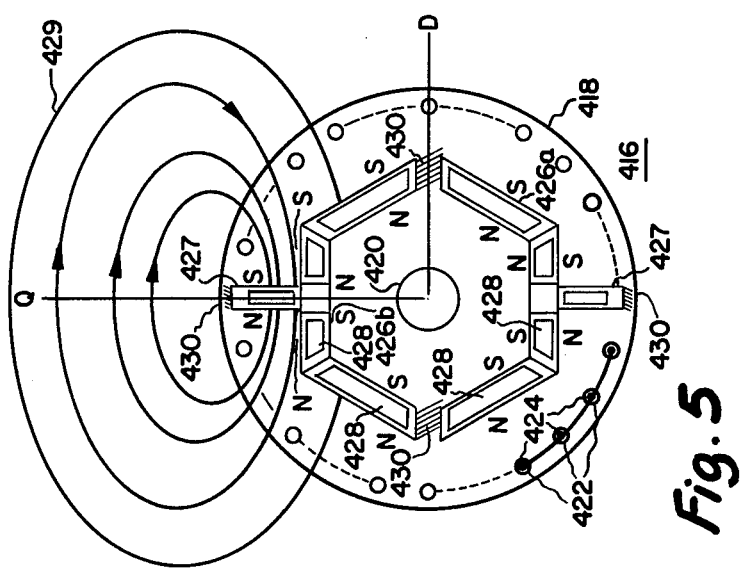
Fig. 6
Fig. 5

HIGH EFFICIENCY, LOW COST PERMANENT MAGNET AC MACHINE

This application is a continuation-in-part of Ser. No. 41,864, filed May 23, 1979, now abandoned, and assigned to the instant assignee.

Background of the Invention

This invention relates to permanent magnet ac machines, and more particularly to a permanent magnet ac machine which provides good asynchronous and good synchronous machine performance at high efficiency while operating at a large power factor.

Certain industrial processes, such as those employed in the synthetic fiber industry, require that the process steps or functions be closely synchronized, thus necessitating the use of synchronous-type machines which are capable of operation at constant speed. The conventional synchronous machine, constructed of a wire wound field which is excited from a source of dc via slip rings, has been found undesirable for use in such applications because of the high cost and complexity associated with such a machine. Instead, synchronous-reluctance type machines have been used. While such synchronous-reluctance machines provide good performance in those applications requiring constant speed, they are subject to several disadvantages.

First, synchronous-reluctance machines inherently exhibit a low power factor and low efficiency and typically draw large current. As a result, a large, and hence costly, power supply is required. Since the typical power supply used for synchronous-reluctance machines is an inverter comprised of a plurality of costly solid state switches such as thyristors, it is most undesirable to increase the power supply cost. Additionally, to stop the rotation of the synchronous-reluctance motor, it is customary to disconnect the ac power supplied to the stator and then apply dc to the stator. These operations require a dc source, dynamic brake contactors, separate dc source buses, and so on.

To avoid the inherent difficulties incurred by the use of synhronous-reluctance machines, synchronous machines of the permanent magnet type have been constructed. The machine has magnets disposed within the rotor core. Flux from the magnets within the rotor core interacts with the flux generated by currents in the stator, thereby causing a torque that accelerates the rotor to synchronous speed, the interaction of rotor magnet flux and stator flux hereinafter being referred to as "synchronous machine action". In contrast to the synchronous-reluctance machine, the permanent magnet ac machine inherently exhibits a high power factor and high efficiency and draws lower current, thus allowing the use of smaller power supplies. Also, the permanent magnet synchronous machine can be readily braked by simply short-circuiting the stator with a contactor.

Permanent magnet machines of known configuration include the permanent magnet machine described in my U.S. Pat. No. 3,126,493, issued Mar. 24, 1964, wherein a plurality of U-shaped magnets are embedded in the rotor core such that each is bisected by a quadrature machine axis. Flux from each magnet serves to oppose a portion of the quadrature axes stator flux. Although denominated "a permanent magnet machine", this motor operates in a manner identical to a synchronous reluctance machine with the difference in magnetic reluctance between the quadrature axes stator and rotor flux providing a torque to accelerate the rotor to synchronous machine speed. However, positioning the permanent magnets within the rotor in the manner described in my previous patent results in a complicated rotor structure which does not allow direct axes rotor flux to complement direct axes stator flux which is necessary for good synchronous machine performance.

Another permanent magnet synchronous machine, described in British Pat. No. 1,056,605 published on Jan. 25, 1967 comprises a permanent magnet rotor disposed for rotation about a stator. The permanent magnet rotor comprises a core constructed of a plurality of core laminations. A rotor winding, created by a plurality of interconnected conductors, each connected at the respective end faces to an adjacent conductor, is embedded within the rotor core. Currents induced in the winding during machine start up generate a torque which accelerates the rotor towards synchronous speed. Arcuate magnets are secured about the periphery of the rotor, with a leakage path separating adjacent magnets, and provide reluctance action with stator flux to achieve synchronous machine performance. It is the inventor's opinion that the permanent magnet synchronous machine detailed in British Pat. No. 1,056,605 will not achieve good asynchronous machine performance because of the limited flux path afforded the rotor winding.

Another design of a synchronous permanent magnet machine is presented by K. J. Binns et al. in the paper entitled "Hybrid Permanent magnet Synchronous Motors" published in the Proceedings of the IEE, Vol 125, No. 3, March 1978. Binns et al. propose a four pole permanent magnet synchronous machine which is constructed of a laminate core having four permanent magnets positioned equidistantly about the rotor circumference to provide corresponding pole saliencies. Flux barriers are required to concentrate permanent magnet flux at the pole corners to achieve synchronous machine performance. Such flux barriers, however, are believed to weaken the rotor laminations, and thus require that motor speeds be limited.

Another suggested approach is a permanent magnet synchronous machine comprised of a plurality of pairs of semicircular stack laminations which are mounted on a ferromagnetic shaft, each stack lamination of each pair being separated on the shaft from an adjacent stack lamination by a nonmagnetic material. A plurality of pairs of permanent magnets, corresponding in number to the number of stack laminations, are each disposed between a semicircular stack lamination and the ferromagnetic shaft. Axial bolts secure the stack laminations together. In the inventor's opinion, this permanent magnet synchronous machine is subject to the disadvantage that flux from each of the pairs of permanent magnets secured between the stack laminations and the ferromagnetic shaft fringes onto each adjacent pair of permanent magnets, thus reducing air gap flux and hence impairing synchronous machine performance.

In contrast to previous permanent magnet machines, the permanent magnet ac machine of the present invention provides good asynchronous machine performance during intervals of machine acceleration and achieves good synchronous machine performance at synchronous machine speed by complementing direct axis flux wthout the necessity of flux barriers.

Brief Summary of the Invention

Briefly, in accordance with the preferred embodiment of the present invention, a permanent magnet ac machine for achieving asynchronous machine performance during intervals of machine acceleration toward synchronous speed and for achieving improved synchronous machine performance at synchronous speed comprises a stator having a plurality of windings, each of which are excited by alternating current so as to provide a rotating magnetic field within the stator. A permanent magnet rotor is coaxially mounted within the stator for rotation therein and includes a cylindrical core formed of a plurality of unitary laminates positioned in face-to-face relationship on a shaft which extends axially through the center of each laminate. A rotor winding is axially positioned through the cylindrical core inside the periphery of each laminate, securing the rotor laminates together. Induced current in the rotor winding provides a torque to accelerate the rotor, causing asynchronous machine behavior below synchronous machine speeds.

At least two permanent magnets are secured axially through each of the laminates so that each permanent magnet has at least one end segment adjacent to the rotor core laminate periphery. The magnetic members are positioned within the rotor core so that some portion of the flux from each permanent magnet member is directed substantially parallel to a respective direct machine axis and perpendicular to a respective quadrature to interact with the rotating stator field causing a torque which accelerates the rotor to synchronous machine speed.

It is an object of the present invention to provide a permanent magnet synchronous machine which exhibits good asynchronous machine behavior during intervals of rotor acceleration toward synchronous speed and good synchronous machine behavior at synchronous machine speeds.

It is another object of the present invention to provide a motor which operates at high efficiency and high power factor while accelerating toward, and operating at, synchronous machine speeds.

Brief Description of the Drawings

The features of the invention believed to be novel are set forth with particularity in the appended claims. The invention, itself, however, both as to organization and method of operation, together with further objects and advantages thereof, may best be understood by reference to the following description, taken in conjunction with the accompanying drawings in which:

FIG. 2 is an end view of the rotor of FIG. 1;

FIG. 3 is an end view of an alternate preferred embodiment of a four pole permanent magnet rotor adapted for rotation within an ac stator;

FIG. 4 is an end view of a preferred embodiment of an eight pole permanent magnet rotor adapted for rotation within an ac stator;

FIG. 5 is an end view of a preferred embodiment of a two pole permanent magnet rotor adapted for rotation within an ac stator;

FIG. 6 is an end view of an alternate embodiment of a two pole permanent magnet rotor adapted for rotation within an ac stator.

Detailed Description of the Preferred Embodiments

Figure 1:
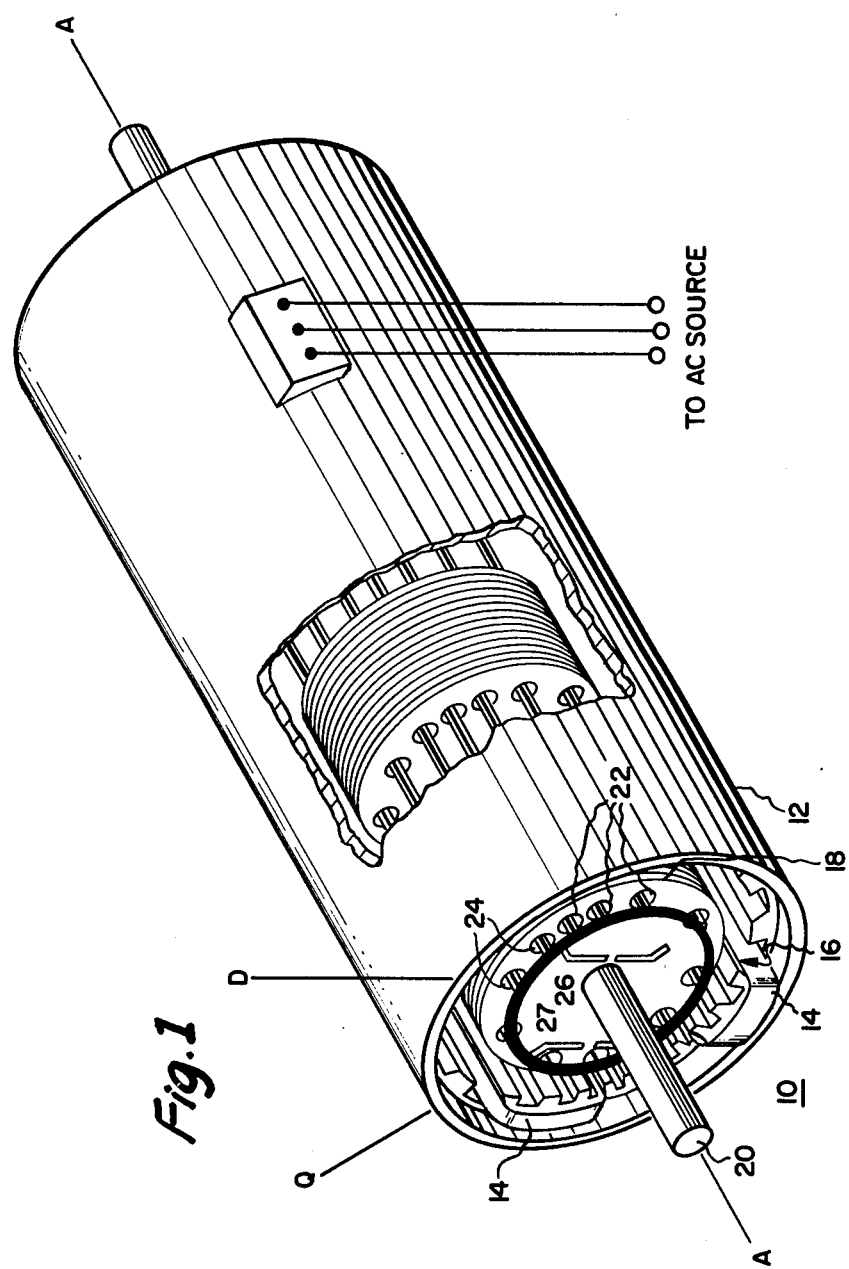
FIG. 1 is a cut away perspective view of a permanent magnet ac machine constructed according to the present invention, illustrating a preferred embodiment of a four pole permanent magnet rotor coaxially mounted for rotation within an ac stator.

FIG. 1 shows a permanent magnet ac machine 10 according to the present invention. Machine 10 comprises a stator 12 which has a plurality of windings 14, each of which are excited by alternating current, for generating a rotating magnetic field within the stator in a direction perpendicular to the longitudinal stator axis denoted by the letter A.

A four pole permanent magnet rotor 16 is coaxially mounted within stator 12 for rotation about the longitudinal stator axis. Rotor 16 is constructed of a plurality of thin circular laminates 18, each typically formed from a material such as electrical silicon steel or the like. Each laminate is positioned in face-to-face relationship with each adjacent laminate on shaft 20. Unlike previous permanent magnet rotor designs, which require a nonmagnetic shaft, shaft 20 need not be nonmagnetic but, in fact, may be constructed of materials susceptible to permeation by magnetic flux, such as iron or steel.

Referring now to both FIGS. 1 and 2, each rotor laminate 18 contains a plurality of perforations 22 spaced equidistantly inside the laminate periphery. Each of perforations 22 of each laminate 18 is in axial alignment with a respective one of the perforations of each adjacent laminate, thus creating a like number of perforation passages which extend axially through rotor 16. Each perforation passage accommodates a corresponding one of rotor bars 24, which are typically each comprised of a copper conductor or the like. Each of rotor bars 24 extends beyond rotor 16 for electrical connection to the respective end faces of each adjacent rotor bar to provide a closed rotor winding which secures laminates 18 together. During asynchronous operation of machine 10, current is induced in the rotor winding, resulting in a flux which interacts with the rotating stator field generated by stator windings 14 causing an accelerating torque which accelerate the rotor.

An even number of slots or channels 26 are also inscribed in each of laminates 18. The slots or channels 26 are positioned in the disc laminations 18 to form two parallel chords equidistant and on either side of the center of the lamination. Each slot contains a radially extending end portion or segment 27 adjacent to the laminate periphery, each radially extending end segment of each slot being diametrically opposed to a radially extending end segment 27 of another slot 26. The purpose of positioning each of segments 27 adjacent to the laminate periphery will be explained hereinbelow. Each of slots 26 of each laminate 18 is in axial alignment with a respective one of slots 26 of each adjacent laminate, thereby creating a like number of slot passages which extend axially through rotor 16.

Each of a plurality of magnetic members 28, formed of a magnetic material, such as rare earth cobalt alloys, a ferrite, Alnico, or the like, and shaped to conform to slots 26, is positioned through a respective one of the rotor slot passages so that the north magnetic pole of each permanent magnet member faces essentially radially outward as indicated in FIG. 2. Consequently, the resultant flux from each of magnetic members 28 follows flux paths 29, a portion of which are substantially parallel to a respective direct axis D, which define the points of maximum air gap flux density, each D axis lying midway between each pair of adjacent radially extending slot segments. In this manner, magnet member 28 flux complements direct axis flux to insure good synchronous machine performance. Flux from each of magnetic members 28 is also directed substantially parallel to a respective quadrature axis Q, which defines the points of minimum air gap flux density, each Q axis lying parallel to each radially extending slot segment 27. Quadrature axis stator flux is perpendicular to the quadrature axis, and opposes magnetic member 28 quadrature axis rotor flux.

Steel bridges 30, being that portion of each laminate 18 between end segments 27 of slots 26 and the laminate periphery and that portion of the laminate between adjacent slots, being indicated by the shaded areas are provided to afford mechanical strength to the rotor. Bridges 30 are each dimensioned such that during rotor rotation, magnetic flux from each magnetic member permeates an adjacent bridge to saturate it.

FIG. 3 shows an alternate embodiment of a four pole permanent magnet rotor 216 for rotation within an ac stator. Rotor 216, like rotor 16 of FIGS. 1 and 2, is comprised of a plurality of thin circular rotor laminates 218, each formed from a metal such as electrical silicon steel or the like and positioned in face-to-face relationship with one another on shaft 20. Shaft 20 need not necessarily be nonmagnetic and thus, if desired, can be made susceptible to permeation by magnetic flux.

A plurality of perforations 222 are spaced equidistantly inside the periphery of laminates 218. Each perforation of each individual laminate is axially aligned with a corresponding perforation of an adjacent laminate to create like number of perforation passages which extend axially through rotor 216. Each perforation passage secures a respective one of rotor bars 224 so that each rotor bar extends slightly beyond rotor 216. Rotor bars 224 are each connected at each end face to the respective end faces of each adjacent rotor bar to provide electrically conductive rotor winding which secures laminates 228 together. Currents induced in the rotor winding during asynchronous machine performance provide a torque to accelerate rotor 216 from rest.

Rotor laminates 218 each contain four rectangular slots or channels 226a through 226d, respectively, each positioned perpendicular to one another in a rectangular fashion about shaft 220. Each of end segments 227a through 227d of slots 226a through 226d, respectively, extend in an approximately radial direction at an obtuse angle with respect to the body of each slot so as to be diametrically opposed to an extending end segment of an opposite facing slot such that each separate one of end segments 227a through 227d, respectively, is adjacent to the periphery of laminate 228. Slots 226a through 226d of each laminate are aligned axially with slots 226a through 226d, respectively, of each adjacent laminate, thus creating four corresponding slot passages which extend axially through rotor 216.

Each of a plurality of magnetic members 228, formed of a magnetic material and shaped to conform to slots 226a through 226d, are secured in a respective one of the slot passages of rotor 216 so that the resultant flux from each magnetic member follows flux paths 229, a portion of which are parallel to a respective direct axes D which each lie midway between each pair of extending end segments 227a through 227d. Magnetic member flux is also directed substantially perpendicular to a respective quadrature axes Q which each lie parallel with each of the diametrically opposed pairs of extending end segments to oppose quadrature stator axes flux. Thus, magnetic member 228 flux complements direct axis stator flux to provide good synchronous machine performance.

Steel bridges 230 being that portion of laminates 218 between the radially extending end segments of each slot and the laminate periphery and that portion of the laminates between adjacent slots, indicated by the shaded areas, are provided to afford mechanical strength to the rotor. Bridges 230 are imensioned so that during rotor rotation, magnetic flux from each magnetic member permeates an adjacent bridge to saturate it.

Rotor 216 illustrated in FIG. 3 affords an advantage over rotor 16 illustrated in FIGS. 1 and 2 in that the configuration of magnets within the core of rotor 216 provides for greater flux concentration along the D and Q axes.

FIG. 4 shows a preferred embodiment 316 of an eight pole permanent magnet rotor adapted for rotation within an ac stator. Rotor 316 comprises a plurality of circular laminates 318, each formed of electrical silicon steel or the like, which are positioned in face-to-face relationship with one another on a shaft 320. As with previously described permanent magnet rotor embodiments of FIGS. 1–3, shaft 320 need not necessarily be nonmagnetic.

Each of rotor laminates 318 contains a plurality of perforations 322 spaced equidistantly inside the laminate periphery. Each perforation of each laminate is in axial alignment with a respective perforation of an adjacent laminate thereby creating a like number of perforation passages which extend axially through rotor 316.

A respective one of rotor bars 324 is secured through each perforation passage so as to extend slightly beyond rotor 316. Each of rotor bars 324 is electrically connected at each end face to the end faces of each adjacent rotor bar, forming an electrically conductive rotor winding which secures laminates 318 together. Currents induced in the rotor winding during intervals of asynchronous machine behavior provide a torque to accelerate rotor 316 from rest.

Each of rotor laminates 318 contains eight radially extending slots or channels 326a through 326h, respectively, spaced equidistantly about shaft 320 with the end of each slot adjacent to the periphery of laminates 318. Each of slots 326a through 326h of each laminate is in axial alignment with a respective one of slots 326a through 326h of each adjacent laminate so as to create a like number of axially extending perforation passages through rotor 316. A plurality of magnetic members 328, each comprised of a magnetic material, are secured within a respective perforation passage as shown in FIG. 4 such that the north magnetic pole of a magnetic member 328 secured through a slot such as slot 326a, for example, faces a north magnetic pole of a magnetic member 328 secured through an adjacent slot such as slot 326h. As a result of the magnetic orientation of magnetic members 328, flux from each magnetic member follows flux paths 329 a portion of which are parallel to a respective direct machine axes D which each lie midway between each adjacent pair of radially extending slots so that magnetic member 328 flux complements direct axis stator flux to provide good synchronous machine performance. Flux from each of magnetic members 328, is also directed substantially perpendicular to a respective quadrature machine axes Q which each lie parallel to each of radially extending slots 326a through 326h, respectively, so that magnetic member 328 flux opposes stator quadrature axis flux.

Steel bridges 330, being that portion of laminates 318 between the radially extending end segments of slots 326 and the laminate periphery and that portion of the laminate between adjacent slots, indicated by the shaded areas, are provided to afford mechanical strength to the rotor. Bridges 330 are dimensioned so that during rotor rotation, magnetic flux from each magnetic member permeates the adjacent bridge to saturate it.

FIG. 5 shows a preferred embodiment 416 of a two pole permanent magnet rotor adapted for rotation within an AC stator. Rotor 416 comprises a plurality of circular rotor laminates 418 each of which are formed from electrical silicon steel or the like and are positioned in face-to-face relationship with one another on shaft 420. Shaft 420, if desired, can be constructed to be susceptible to permeation by magnetic flux.

Laminates 418 each contain a plurality of perforations 422 spaced equidistantly inside the laminate periphery. Each of perforations 422 of each laminate 418 is in axial alignment with a respective perforation of an adjacent laminate to create a like number of axially extending perforation passages through rotor 416.

Each perforation passage accommodates one of rotor bars 424 which rotor bars extend slightly beyond rotor 416. Each rotor bar is connected at each end face to the respective end faces of each adjacent rotor bar to provide an electrically conductive winding which secures laminates 418 together. Currents induced in the winding during intervals of asynchronous machine operation produce a torque to accelerate the rotor from rest.

Each of laminates 418 contains two generally "Y" shaped slots 426a and 426b spaced symmetrically about shaft 420. The elongate portion 427 of each slot extends radially so as to be adjacent to the periphery of laminates 418 and each is diametrically opposed to the remaining elongate portion 427 of the remaining slot. Each of slots 426a and 426b of each laminate 418 is in axial alignment with a respective one of slots 426a and 426b of an adjacent laminate to yield a like number of axially extending slot passages through rotor 416. One of a plurality of magnetic members 428, each comprised of a magnetic material, is secured within each of the slot passages of rotor 416 so that the north pole of those magnetic members positioned in the slot passages to the right of the elongate portion 427 of slots 426a and 426b face radially inward while the north magnetic pole of those magnetic members positioned in those slot passages to the left of elongate portion 427 of each of slots 426a and 426b face radially outward. As a consequence, magnetic flux from each magnetic member follows flux paths 429, a portion of which are substantially parallel to the direct axis D which lies equidistantly between elongate channel portion 427, so that magnetic member 428 flux complements direct axis stator flux to provide good synchronous machine performance.

Additionally, magnetic member 428 flux is directed substantially perpendicular to the quadrature axis Q which lies parallel to the elongate channel portions 427 so that magnetic member 428 flux opposes quadrature axis stator flux.

Steel bridges 430, being that portion of laminates 418 between the elongate portion 427 of each slot and the laminate periphery and that portion of the laminates between adjacent slots, indicated by the shaded areas, are provided to afford mechanical strength to the rotor. Bridges 430 are dimensioned so that during rotor rotation, magnetic flux from each magnetic member permeates an adjacent bridge to saturate it.

FIG. 6 shows an alternative embodiment 516 of a two pole permanent magnet rotor for rotation within an ac stator. Rotor 516 is comprised of a plurality of circular rotor laminates 518, each typically formed of electrical silicon steel or the like, which are positioned in face-to-face relationship with one another on shaft 520. Shaft 520 need not necessarily be nonmagnetic.

Each of laminates 518 contains a plurality of perforations 522 spaced equidistantly inside the periphery of each laminate. The perforations in each laminate are axially aligned with perforations in each adjacent laminate, thus creating a like number of perforation passages extending axially to rotor 516.

Rotor bars 524, each typically comprised of a copper conductor or the like, are each secured in each of the perforation passages, respectively, so as to extend slightly beyond rotor 516. Each of rotor bars 524 is electrically connected at each end face to the respective end faces of each adjacent rotor bar to form electrically conductive rotor winding which secures laminate 518 together. During asynchronous machine operation, current is induced in the rotor winding to produce a torque to accelerate the rotor from rest.

Laminates 518 each contain two slots or channels 526a and 526b, respectively, which are configured about shaft 520 as shown in FIG. 6. Each of slots 526a and 526b, respectively, includes a radially extending slot segment 527 adjacent to the laminate periphery which is diametrically opposed to the radially extending slot segment of the other slot. Slots 526a and 526b, respectively, of each laminate 518 are in axially alignment with slots 526a and 526b, respectively, of each adjacent laminate, thus creating a like number of slot passages which extend axially through rotor 516.

One of a plurality of magnetic members 528, each comprised of a magnetic material, is secured in each slot passage so that the north magnetic pole of magnetic member 528 positioned in slot 526a faces radially outward while the north magnetic pole of magnetic member 528 in slot 526b faces radially inward. The resultant flux from each of magnetic members 528 follows flux paths 529 a portion of which are parallel to the direction machine axis which lies perpendicular to the radially extending slot segments 527 of each of slots 526a and 526b so that, magnetic member 528 flux complements direct axis stator flux, thus providing good synchronous machine performance. In addition, magnetic member 528 flux is directed substantially perpendicular to the quadrature axis Q which lies parallel to slot segments 527 of each of slots 526a and 526b so that magnetic member 528 flux opposes quadrature axis stator flux.

Steel bridges 530, being that portion of laminates 518 between end segments of slots 526 and the laminate periphery and that portion of the laminates between adjacent slots indicated by the shaded area, are provided to afford mechanical strength to the rotor. Bridges 530 are each dimensioned so that during rotor rotation, magnetic flux from each magnetic member permeates an adjacent bridge to saturate it.

Figure 7:
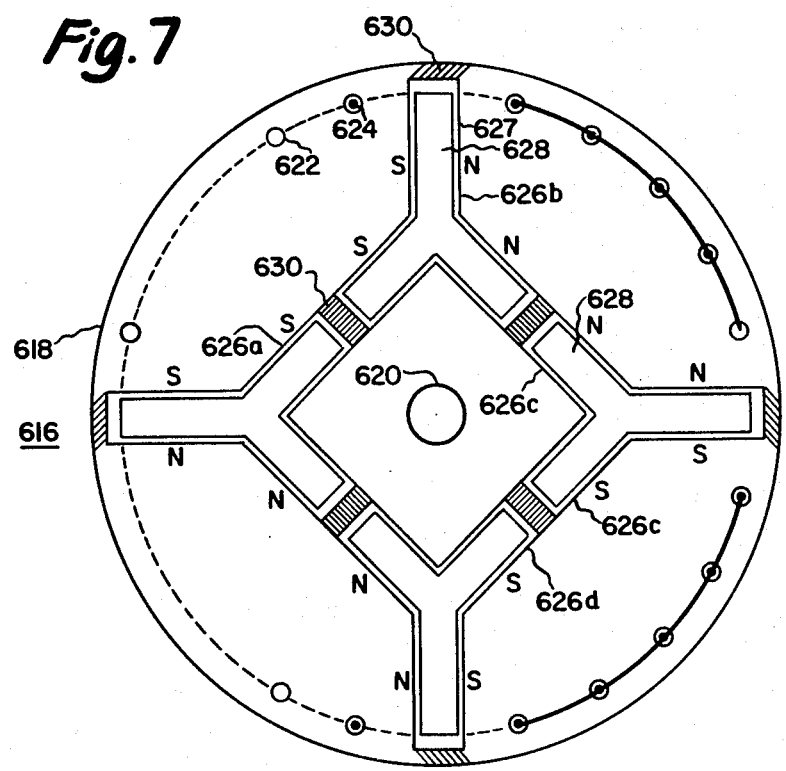
FIG. 7 is an end view of another alternate embodiment of a four pole permanent magnet rotor adapted for rotation within an ac stator.

FIG. 7 shows an alternative embodiment 616 of a four pole permanent magnet rotor adapted for rotation within an AC stator. Rotor 616 comprises a plurality of circular laminates 618, each of which are formed from electrical silicon steel or the like and are positioned in face-to-face relationship on a shaft 620, which can be constructed of either a magnetic or an amagnetic material.

Laminates 618 each contain a plurality of perforations 622 spaced equidistantly inside the laminate periphery. Each of perforations 622 in each laminate 618 is in axial alignment with a respective perforation in an adjacent laminate to create a like number of axially extending perforation passages through rotor 616.

Each perforation passage accommodates one of rotor conductors 624 which each extend slightly beyond rotor 616. Each rotor conductor is connected at each end face to the respective end faces of an adjacent rotor conductor to provide an electrically conductive winding which secures laminates 618 together. Currents induced in the winding during intervals of asynchronous machine operation produce a torque on the winding to accelerate the rotor from rest.

Each of laminates 618 contains four generally "Y" shaped slots 626a, 626b, 626c and 626d, respectively, which are spaced symmetrically about shaft 620. The elongate portion 627 of each of slots 626a-626d extends radially so as to be adjacent to the laminate periphery. The elongate portion 627 of each slot is positioned substantially 90° from the elongate portion 627 of an adjacent slot. Each of slots 626a-626d, respectively, of each laminate is in axial alignment with a respective one of slots 626a-626d of an adjacent laminate, thus yielding a like number of axially extending slot passages through rotor 616. A plurality of magnetic members 628, each comprised of a magnetic material, and shaped to conform to slots 626a-626d, are secured through a respective one of the rotor slot passages such that the north magnetic pole of each magnetic member 628 faces a north magnetic pole of each adjacent magnetic member. The direct machine axis D which lies midway between each adjacent pair of radially extending slot segments. Flux from each of magnetic members 628 is also directed substantially perpendicular to a respective quadrature axis Q, each of which are lying parallel to the elongate portion 627 of a respective slot. In this way, magnetic flux from each of magnetic members 628 complements direct axes stator flux to provide good synchronous machine performance.

Steel bridges 630, being that portion of laminate 618 between the radially extending elongate portion of each slot and the periphery of the laminate, and also that portion of the the laminate between adjacent slots, indicated by the shaded areas, are provided to afford mechanical strength to the rotor. The bridges are dimensioned such that during rotor rotation, flux from each magnetic member permeates the adjacent bridge to saturate it.

Each of permanent magnet rotors 216, 316, 416 and 516, illustrated in FIGS. 3, 4, 5 and 6, respectively, when mounted within a stator having a plurality of windings each excited by alternating current, operates in a manner identical to rotor 16 mounted within stator 12 as shown in FIGS. 1 and 2. Therefore, only the operation of permanent magnet machine 10 is set forth below.

Figure 8:
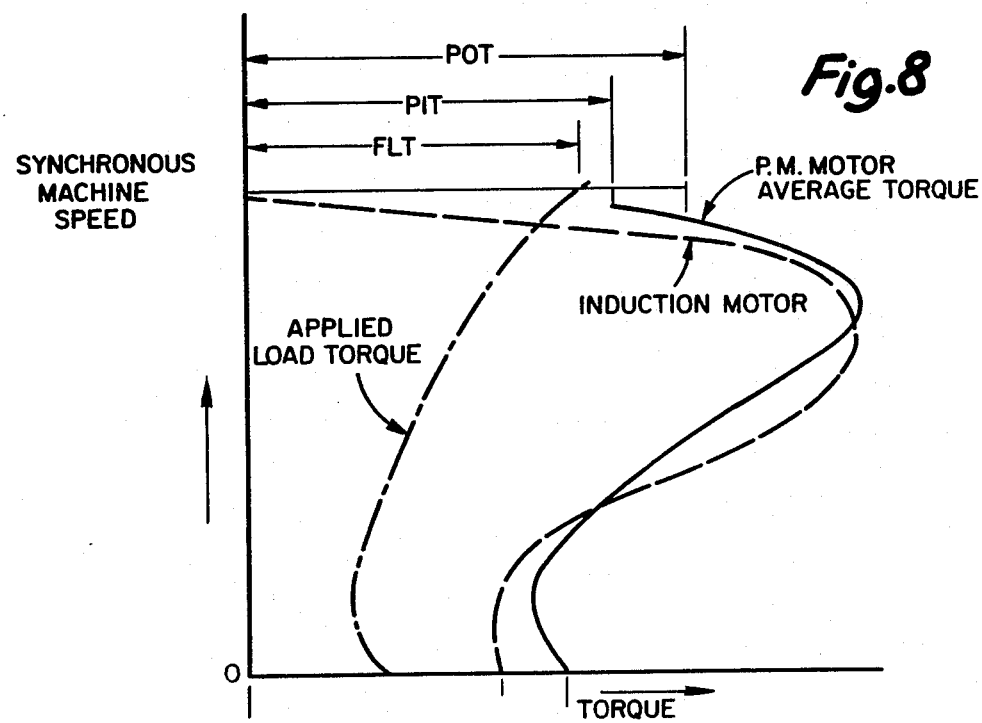
FIG. 8 is a graphical representation of the average torque vs. speed relationships for a conventional induction machine and for the permanent magnet ac machine of the present invention.

Initially, it is assumed that rotor 16 is at rest and that stator windings 14 are each excited by alternating current, thus generating a rotating magnetic field in stator 12 perpendicular to the stator axes A. By transformer action currents are induced in the winding created by the interconnection of rotor bars 24 to generate a torque to accelerate rotor 16 from rest in a manner analogous to the operation of a conventional squirrel cage induction rotor. This may be understood by reference to FIG. 8 which illustrates the average torque versus speed curves of the permanent magnet machine of the present invention and a conventional induction motor. As is evident from FIG. 8, during the interval of rotor 16 acceleration toward synchronous speed, the average resultant torque versus speed curve of machine 10, illustrated by the solid line, is virtually identical to that of a conventional induction motor torque-speed curve which is illustrated by the dashed line, indicating that machine 10 exhibits good asynchronous machine performance.

In addition to providing a closed path in which currents are induced to generate a torque to accelerate rotor 16 from the rest as described above, the rotor winding created by the interconnection of rotor bars 24 serves the additional important function of preventing demagnetization of magnetic members 28. Without the presence of the rotor winding, stator flux would exert a strong demagnetizing force on each of magnetic members 28, weakening them. However, the currents induced in the rotor winding during intervals of asynchronous machine operation generate magnetic fields which tend to nullify stator flux, causing each of magnetic members 28 to experience only the difference between stator flux and opposing flux resulting from induced rotor currents.

Rotor 16 continues to accelerate as a result of induced current in the rotor winding until synchronous speed is approached, at which speed, the flux fields from magnetic members 28 synchronize with the rotating magnetic field of stator 12, allowing permanent magnet machine 10 to exhibit synchronous machine performance. As illustrated in FIG. 7, such synchronism, occurs at synchronous machine speed when the load torque applied to permanent magnet motor 10, represented by the broken line, is less than the pull-in torque (PIT) which is defined as the maximum load torque at which permanent magnet machine 10 can synchronize with a given inertia. If, during intervals of synchronous machine behavior, the required shaft torque exceeds the pull-out torque (POT) which is defined as the maximum torque at which permanent magnet machine 10 synchronism can be maintained, then, permanent magnet machine synchronization is broken and asynchronous machine behavior results. For the permanent magnet machine of FIGS. 1 and 2, a typical range of pull-out torque is between 125 and 200% of full load torque (FLT), indicating machine 10 exhibits good synchronous machine performance.

Performance of the permanent magnet motor of the present invention can be predicted (neglecting armature resistance) by the following expression:

$$P_e = \frac{E_o V}{X_d} \sin\delta + V^2 \frac{(X_d - X_q)}{2X_d X_q} \sin(2\delta)$$

where $P_e$ equals the power developed, $X_d$ equals the direct axes reactance, $X_q$ equals the quadrature axis reactance, $E_o$ equals the open circuit voltage generated in the stator winding by magnetic flux alone with zero armature current, V equals the line voltage and δ equals the torque angle. About 85% of the shaft power is given by the first term; the second term $$V_2 \frac{(X_d - X_q)}{2X_dX_q} \sin(2\delta)$$

representing the reluctance power. $E_o$ and $X_d$ are determined by the size and shape and magnetic material of the magnetic members, as well as the configuration of the armature winding. I have found that for a given armature winding configuration and magnetic material, positioning permanent magnet members within the rotor interior in the configuration described for each of the permanent magnet rotors described above, namely, with each magnetic member secured axially through said rotor core with at least one end segment adjacent to the rotor core periphery and each magnet member being positioned such that a portion of magnetic flux therefrom is directed parallel to a respective direct axis and perpendicular to a respective quadrature axis, results in the largest possible flux density and hence a large open circuit voltage thereby increasing the power capability of the permanent magnet motor.

Construction of the permanent magnet machine described above can be accomplished at low cost because no special machining is required. The laminates which comprise the rotor core can be readily stamped from sheets of electrical silicon steel. Also, since the rotor shaft need not be nonmagnetic, expensive nonmagnetic materials such as stainless steel, need not be used.

The foregoing describes a high efficiency, low cost permanent magnet asynchronous machine. The machine achieves good asynchronous machine performance from an electrical winding embedded inside the rotor core adjacent to the rotor core periphery. Magnetic members, secured axially through the rotor core with a portion thereof extending approximately radially so as to be adjacent to the rotor core periphery, generate flux which is directed parallel to the direct machine axes for complementing direct machine axes stator flux to provide good synchronous machine performance.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. A permanent magnet synchronous machine for operating asynchronously during intervals of initial machine acceleration at speeds less than synchronous machine speed and for operating as a synchronous machine at synchronous machine speeds comprising:
    a stator having a plurality of windings excited by alternating current to provide a rotating magnetic field within the stator; and
    a permanent magnet multipole rotor mounted within said stator for rotation therein, said rotor including:
        a rotor core configured of a plurality of unitary disc laminations, each of said laminations having a periphery, said rotor core having a shaft extending axially through said laminations;
        an electrically conductive winding secured through said rotor core laminations adjacent to the laminate periphery, said electrically conductive winding securing said rotor core laminations in face-to-face relationship with one another; and
        a plurality of magnetic members secured axially through said rotor core laminations and extending radially about said rotor shaft with one end segment of each magnetic member being adjacent to the lamination periphery and being separated from the periphery by a section of said laminations dimensioned so that the magnetic flux saturates the section during machine operation, said magnetic members polarized such that the sides of the magnetic members facing each other have like polarity said machine having as many poles as there are radially extending magnetic members.

2. The permanent magnet synchronous machine of claim 1 wherein the end segments of the magnetic members adjacent to the laminate periphery extend in the radial direction.

* * * * *